W. KIPPENHAN.
ROD COUPLING.
APPLICATION FILED FEB. 9, 1920.
1,390,042. Patented Sept. 6, 1921.
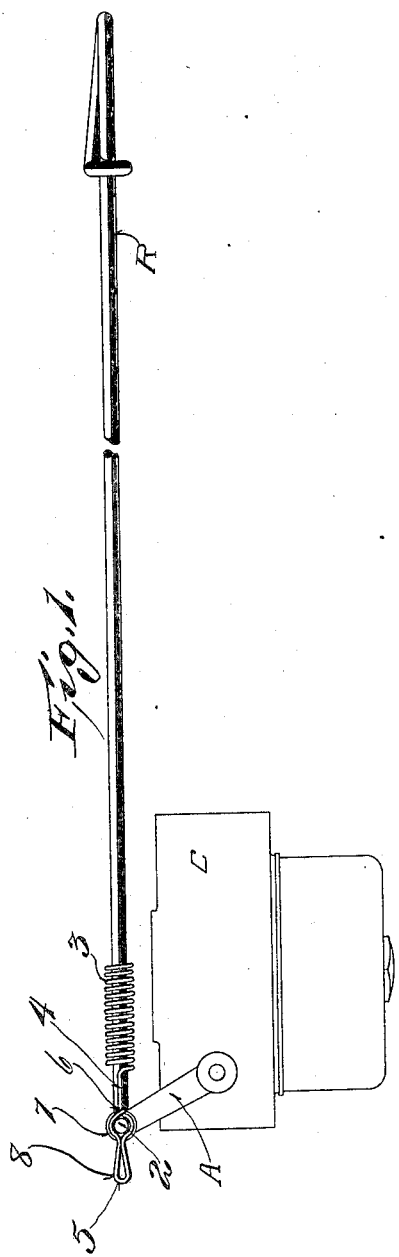
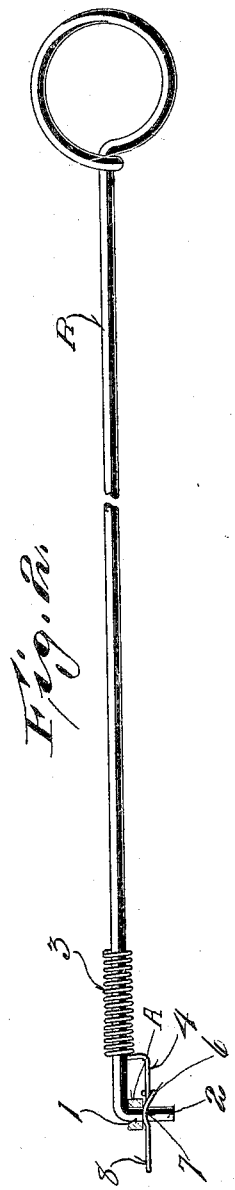
Witness!
Robert Weber
Inventor:
W. Kippenhan
By Young & Young
Attorneys!

UNITED STATES PATENT OFFICE.

WILLIAM KIPPENHAN, OF KEWASKUM, WISCONSIN.

ROD-COUPLING.

1,390,042.　　　　Specification of Letters Patent.　　Patented Sept. 6, 1921.

Application filed February 9, 1920. Serial No. 357,289.

*To all whom it may concern:*

Be it known that I, WILLIAM KIPPENHAN, a citizen of the United States, and resident of Kewaskum, in the county of Washington and State of Wisconsin, have invented certain new and useful Improvements in Rod-Couplings; and I do hereby declare that the following is a full, clear, and exact description thereof.

My invention relates to new and useful improvements in means for connecting or coupling two rods or similar articles together, and the device has particular application where it is necessary to frequently and quickly disconnect the two parts.

My device is designed primarily for use in automobile work, but is adapted to be used in any industry to take the place of cotter pins and other connecting elements which are relatively difficult to remove.

It is therefore the object of this invention to provide an arrangement for making a quickly attachable and detachable connection between a pair of rods, between a rod and an arm, or between any other two analogous articles.

With this general object in view the invention resides in the novel features of construction and arrangement of parts which will be hereinafter more particularly described and claimed.

In the accompanying drawings:

Figure 1 represents a side elevational view of a carbureter throttle actuating rod coupled to the throttle arm by means of my invention.

Fig. 2 is a plan view of the throttle actuating rod together with the invention, the throttle arm being shown in section.

Referring more particularly to the drawing, C represents a portion of a carbureter having a throttle arm A, the end of which is provided with an eye 1, this arm A being moved by means of an actuating rod R. In the present instance this rod has a laterally offset end 2 which is rotatably received in the eye 1 of the throttle arm A. Under ordinary circumstances the end 2 would be retained in engagement with the arm A by means of a nut or a cotter pin, but in either case the nut or the cotter pin is relatively difficult of removal.

The present invention therefore contemplates means for more readily connecting the arm A and rod R. This consists in Figs. 1 and 2 of a flexible sleeve 3 formed of a coil of wire and slidably disposed on said rod R, one end of the coil being extended in the direction of the axis of the sleeve to form a resilient arm 4.

The wire forming this arm 4 is bent upon itself as at 5 and has its free end secured as at 6 in such a manner as to provide an eye or loop 7. That portion of the arm between the eye 7 and the bend 5 provides a finger piece 8 whereby the said arm is readily manipulated.

In applying the coupling, the flexible sleeve 3 is slipped around the lateral end 2 onto the main portion of the rod R, after which said end 2 is inserted through the eye 1 of the throttle arm A. By grasping the finger piece and springing the arm 4 laterally until the eye 7 is alined with the end 2, the former may be readily snapped over the latter. The inherent resiliency of the arm 4 urges that portion thereof forming the eye 7 into engagement with the throttle arm A and in turn forces the latter against the rod R at the junction of the lateral end 2 therewith. As the arm A and rod R are continuously urged together, they are effectively held without possibility of rattling and against accidental disengagement, but the coupling means is so constructed that the arm 4 can be readily slipped out of engagement with the lateral end 2 and the parts disconnected.

From the foregoing description taken in connection with the accompanying drawing, it will be obvious that I have invented an extremely simple coupling for rods and the like, but one which will be thoroughly efficient in operation and will efficiently hold the parts together. The important feature of the invention resides in the fact that the coupling can be easily and quickly thrown out of operation to permit the parts to be disconnected, but it is also to be noted that the device can be easily manufactured and at a relatively slight cost.

I claim:

1. The combination of two members to be connected, of a coupling means comprising a wire coil surrounding one of the members, one end of the coil being extended to form a resilient arm, said arm being offset and extended in a direction parallel to the axis of the coil and having an eye formed therein and engaging one of the members to urge it into contact with the other.

2. The combination of two members to be connected, one having a lateral end receiving the apertured end of the second, of a coupling means comprising a spring coiled around the first member and having one end extended to provide a resilient arm, said arm being offset and parallel to the axis of the coil and having an eye receiving said lateral end of one member and engageable with the second member.

3. As a new article of manufacture, a coupling member comprising a flexible carrying sleeve formed from a coil wire, one end of the coil being extended to provide an arm, said arm being offset and extended in a direction parallel to the axis of the coil and having an eye formed therein about an axis which is perpendicular to the axis of the coil.

In testimony that I claim the foregoing I have hereunto set my hand at Kewaskum, in the county of Washington and State of Wisconsin.

WILLIAM KIPPENHAN.